US007828286B2

(12) United States Patent  (10) Patent No.: US 7,828,286 B2
Dekoning  (45) Date of Patent: Nov. 9, 2010

(54) AUTOMATIC DOCUMENT SCANNER WITH UPRIGHT VISIBLE DOCUMENT IMAGES

(75) Inventor: Petrus T. Dekoning, Toronto (CA)

(73) Assignee: Xerox Corporation, Norwalk, CT (US)

( * ) Notice: Subject to any disclaimer, the term of this patent is extended or adjusted under 35 U.S.C. 154(b) by 313 days.

(21) Appl. No.: 11/272,184

(22) Filed: Nov. 10, 2005

(65) Prior Publication Data

US 2007/0102872 A1    May 10, 2007

(51) Int. Cl.
*B65H 29/00*    (2006.01)
(52) U.S. Cl. .................. 271/184; 271/185; 271/188
(58) Field of Classification Search .................. 271/184, 271/185, 188, 209
See application file for complete search history.

(56) References Cited

U.S. PATENT DOCUMENTS

| | | | |
|---|---|---|---|
| 3,220,569 A * | 11/1965 | Willits et al. ............... 414/794.4 |
| 3,870,868 A * | 3/1975 | Jones ............................ 377/8 |
| 3,918,703 A * | 11/1975 | Mano et al. .................. 271/185 |
| 4,114,804 A * | 9/1978 | Jones et al. .................. 235/476 |
| 4,322,068 A * | 3/1982 | Cayn et al. ................... 271/207 |
| 4,736,939 A * | 4/1988 | Smerke et al. ............... 271/184 |
| 5,000,438 A | 3/1991 | Sardano et al. |
| 5,094,660 A * | 3/1992 | Okuzawa ..................... 493/320 |
| 5,199,700 A * | 4/1993 | Fairey et al. ................. 271/209 |
| 5,249,793 A * | 10/1993 | Scheufler .................... 271/220 |
| 5,687,963 A * | 11/1997 | Mennie ........................ 271/119 |
| 5,711,516 A * | 1/1998 | Pan ............................. 271/3.14 |
| 5,924,808 A * | 7/1999 | Sides, II ...................... 400/679 |
| 6,059,279 A | 5/2000 | Wenthe, Jr. |
| 6,135,591 A * | 10/2000 | Ikeda et al. .................. 347/104 |
| 6,166,394 A | 12/2000 | Rubscha |
| 6,178,410 B1 * | 1/2001 | Kunde et al. ................. 705/406 |
| 6,234,468 B1 * | 5/2001 | Janatka et al. .................. 271/2 |
| 6,280,104 B1 * | 8/2001 | Muller et al. .................. 400/48 |
| 6,322,663 B1 * | 11/2001 | Muller et al. ............. 156/441.5 |
| 6,390,702 B1 * | 5/2002 | Muller ....................... 400/636 |
| 6,574,014 B2 | 6/2003 | Mandel et al. |
| 6,785,024 B1 * | 8/2004 | Corby et al. ................. 358/474 |
| 6,798,899 B2 * | 9/2004 | Mennie et al. .............. 382/135 |
| 6,889,975 B2 * | 5/2005 | Reist et al. .................. 271/225 |
| 2001/0013679 A1 * | 8/2001 | Fukuda ....................... 271/188 |

* cited by examiner

*Primary Examiner*—Saúl J Rodriguez
*Assistant Examiner*—Howard Sanders
(74) *Attorney, Agent, or Firm*—Fay Sharpe LLP

(57) ABSTRACT

Digital scanning of document sheets with a substantially vertical scanning system is provided by sequentially feeding the uppermost document from an upright input loading and image viewing area to a scanning head, and then to an output, along a sheet feeding path which is substantially linear, planar and vertical, but also somewhat rearwardly inclined, defined by a correspondingly rearwardly inclined document rear supporting surface and a substantially horizontal bottom edge supporting surface providing a lateral movement guide and at least initial gravitational registration and support of the bottom edges of the loaded documents. The scanned documents can be automatically ejected to stack in the collated order in which they were fed to be scanned by automatically deflecting them forwardly (outwardly) from their substantially vertical rearwardly inclined lateral movement path onto a forwardly inclined stacking area.

6 Claims, 3 Drawing Sheets

AUTOMATIC DOCUMENT SCANNER WITH UPRIGHT VISIBLE DOCUMENT IMAGES

Disclosed in the embodiment herein is a document scanner with improved visibility to the operator of the document sheets being fed to be scanned by maintaining them substantially upright and facing the operator until after they have been scanned. Also, the sheet path may be short, planar, and automatically gravity edge-registered. A simple system for proper collated restacking of the scanned documents in their original order is also disclosed in this embodiment.

The art of sequentially scanning documents (various print media sheets) to digitize the images thereon for use in printers, copiers, PCs, facsimile, email, archival storage, etc., is well developed. They include various known sheet separating, sheet feeding and sheet imaging systems. Thus, the latter features or systems need not be described in any detail herein. Of background art interest and incorporation by reference of some of those features or systems are: Xerox Corp. U.S. Pat. No. 6,574,014 B2 issued Jun. 3, 2003; U.S. Pat. No. 6,059,279 issued May 9, 2000; U.S. Pat. No. 6,166,394 issued Dec. 26, 2000; U.S. Pat. No. 5,000,438 issued Mar. 19, 1991. Various patents and products teach known constant velocity transport (CVT) document feeders for feeding documents past known digital imaging bars for document imaging.

However, typically the document being scanned in is lying substantially horizontal, and thus at a substantial angle to the scanner operator. In many cases the document sheet being scanned is also being covered up by a platen cover. In some other cases the document being scanned is being fed from the bottom of an overlying stack of other document sheets.

A specific feature of the specific embodiment disclosed herein is to provide a document scanning system for sequentially feeding and digitally scanning document sheets, comprising a digital scanning head and a sheet feeding system with which said document sheets can be fed to be digitally scanned by said digital scanning head, and a document sheet output path from said digital scanning head, and further comprising a substantially vertical and rearwardly inclined rear document sheets supporting surface, a substantially horizontal document sheets bottom edge supporting surface, said rearwardly inclined rear document sheets supporting surface, and said substantially horizontal document sheets bottom edge supporting surface together defining an input tray for feeding document sheets therefrom to said scanning head, said input tray being adapted for said document sheets to be scanned to be loaded and exposed so as to be substantially vertically frontally viewed before being fed to said scanning head, said rear document sheets supporting surface partially defining a generally planar and substantially vertical rearwardly inclined document lateral sheet feeding path against which said document sheets are only partially gravitationally urged by said rearward inclination thereof, said substantially horizontal document sheets bottom edge supporting surface further defining said lateral sheet feeding path, said document sheets being primarily gravitationally urged by said substantially vertical rear document sheets supporting surface against said substantially horizontal document sheets bottom edge supporting surface.

Further specific features disclosed in the embodiment herein, individually or in combination, include those wherein said generally planar and substantially vertical and rearwardly inclined document lateral sheet feeding path extends from said input tray through said digital scanning head to said document sheet output path; and/or wherein said substantially horizontal document sheets bottom edge supporting surface is partially upwardly inclined; and/or wherein said digital scanning head is substantially vertical and rearwardly inclined; and/or wherein said generally planar and substantially vertical and rearwardly inclined document lateral sheet feeding path extends from said input tray through said digital scanning head to said document sheet output path, and wherein said document sheet output path further includes an output stacking area said document sheets; and/or wherein said document sheet output path further includes an output stacking area and an automatic document sheet deflection system for ejecting said document sheets onto said output stacking area, wherein said document sheet deflection system is a passive system in which the lateral movement of a document sheet in said substantially vertical and rearwardly inclined document lateral sheet feeding path from said digital scanning head in said document sheet output path engaging said document sheet deflection system at least partially deflects said document sheet onto said output stacking area; and/or wherein said document sheet output path further includes an output stacking area and an automatic document sheet deflection system for ejecting said document sheets onto said output stacking area, wherein said document sheet deflection system is a passive system in which the lateral movement of a document sheet in said substantially vertical and rearwardly inclined document lateral sheet feeding path from said digital scanning head engages said document sheet deflection system to partially deflect said document sheet into a position forwardly inclined from the vertical so that said document sheet falls gravitationally onto said output stacking area, wherein said output stacking area is forwardly inclined; and/or wherein said document sheet output path further includes an output stacking area and an automatic document sheet stacking system for stacking said document sheets onto said output stacking area, wherein said sheet feeding system feeds the uppermost said document sheet in said input tray to said digital scanning head, and wherein said automatic document sheet stacking system stacks said document sheets onto said output stacking area in the same order in which said sheet feeding system feeds said document sheets from said input tray to said digital scanning head; and/or wherein said document sheet output path further includes an output stacking area and an automatic document sheet stacking system for stacking said document sheets onto said output stacking area, wherein said sheet feeding system feeds the uppermost said document sheet in said input tray to said digital scanning head, wherein said automatic document sheet stacking system stacks said document sheets forwardly inclined onto said output stacking area in the same order in which said sheet feeding system feeds said document sheets from said input tray to said digital scanning head, and wherein said document sheet deflection system is a passive system in which the lateral movement of a document sheet in said substantially vertical and rearwardly inclined document lateral sheet feeding path from said digital scanning head in said document sheet output path partially deflects said document sheet by engagement with said document sheet deflection system into a position forwardly inclined from the vertical so that said document sheet falls gravitationally onto said output stacking area; and/or a document scanning method in which document sheets are sequentially feed from a document input area by a sheet feeding system to be digitally scanned with a digital scanning head and then fed to a document sheet output path from said digital scanning head, wherein said document sheets have a substantially linear and substantially vertical and rearwardly inclined sheet feeding path defined by a substantially vertical and rearwardly inclined rear document sheets supporting surface and a substantially horizontal document sheets bottom edge supporting surface which is gravitationally supporting the bottom edges of said document sheets, said document sheets are loaded into said input area exposed for substantially vertical frontal viewing before being fed to said digital scanning head, and said document sheets are guided laterally along said substantially vertical and rearwardly inclined sheet feeding path from said document input area through said digital scanning head and then to said document sheet output path; and/or wherein said document sheet output path further includes an output stacking area and a document sheet deflection system automatically ejecting said document sheets onto said output stacking area, wherein said laterally moving document sheets engage said document sheet deflection system to at least partially deflect said document sheets onto said output stacking area; and/or wherein said document sheet output path further includes an output stacking area and a document sheet deflection system automatically ejecting said document sheets onto said output stacking area, wherein said laterally moving document sheets engage said document sheet deflection system to at least partially deflect said document sheets onto said output stacking area, wherein said document sheet deflection system is a passive system in which the lateral movement of a document sheet in said substantially vertical and rearwardly inclined document lateral sheet feeding path from said digital scanning head engages said document sheet deflection system to partially deflect said document sheet into a position forwardly inclined from the vertical so that said document sheet falls gravitationally onto said output stacking area; and/or wherein said document sheet output path further includes an output stacking area and a document sheet deflection system for automatically ejecting said document sheets onto said output stacking area, wherein said laterally moving document sheets engage said document sheet deflection system to at least partially deflect said document sheets from said substantially vertical and rearwardly inclined document lateral sheet feeding path onto said output stacking area, wherein the document sheets are sequentially fed uppermost document sheet first from said document input area to said digital scanning head, and wherein said document sheets stack in said output stacking area in the same order in which said document sheets are so fed from said document input area to said digital scanning head.

The disclosed system may be operated and controlled by appropriate operation of conventional control systems. It is well known and preferable to program and execute imaging, paper handling, and other control functions and logic with software instructions for conventional or general purpose microprocessors, as taught by numerous prior patents and commercial products. Such programming or software may, of course, vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software or computer arts. Alternatively, the disclosed control system or method may be implemented partially or fully in hardware, using standard logic circuits or single chip VLSI designs.

The term "reproduction apparatus" or "printer" as used herein broadly encompasses various printers, copiers or multifunction machines or systems, xerographic or otherwise, unless otherwise defined in a claim. The term "sheet" herein refers to a usually flimsy physical sheet of paper, plastic, or other suitable physical substrate for images, whether precut or web fed. The term "digital scanning head" herein is intended to cover, inter alia, various systems with either one scanner imaging bar scanning one side of a document, or two imaging bars for scanning both sides of a duplex document in a single pass. Both are known in the art.

As to specific components of the subject apparatus or methods, or alternatives therefor, it will be appreciated that, as is normally the case, some such components are known per se in other apparatus or applications, which may be additionally or alternatively used herein, including those from art cited herein. For example, it will be appreciated by respective engineers and others that many of the particular component mountings, component actuations, or component drive systems illustrated herein are merely exemplary, and that the same novel motions and functions can be provided by many other known or readily available alternatives. All cited references, and their references, are incorporated by reference herein where appropriate for teachings of additional or alternative details, features, and/or technical background. What is well known to those skilled in the art need not be described herein.

Various of the above-mentioned and further features and advantages will be apparent to those skilled in the art from the specific apparatus and its operation or methods described in the example below, and the claims. Thus, they will be better understood from this description of this specific embodiment, including the drawing figures (which are approximately to scale) wherein:

Figure 1:
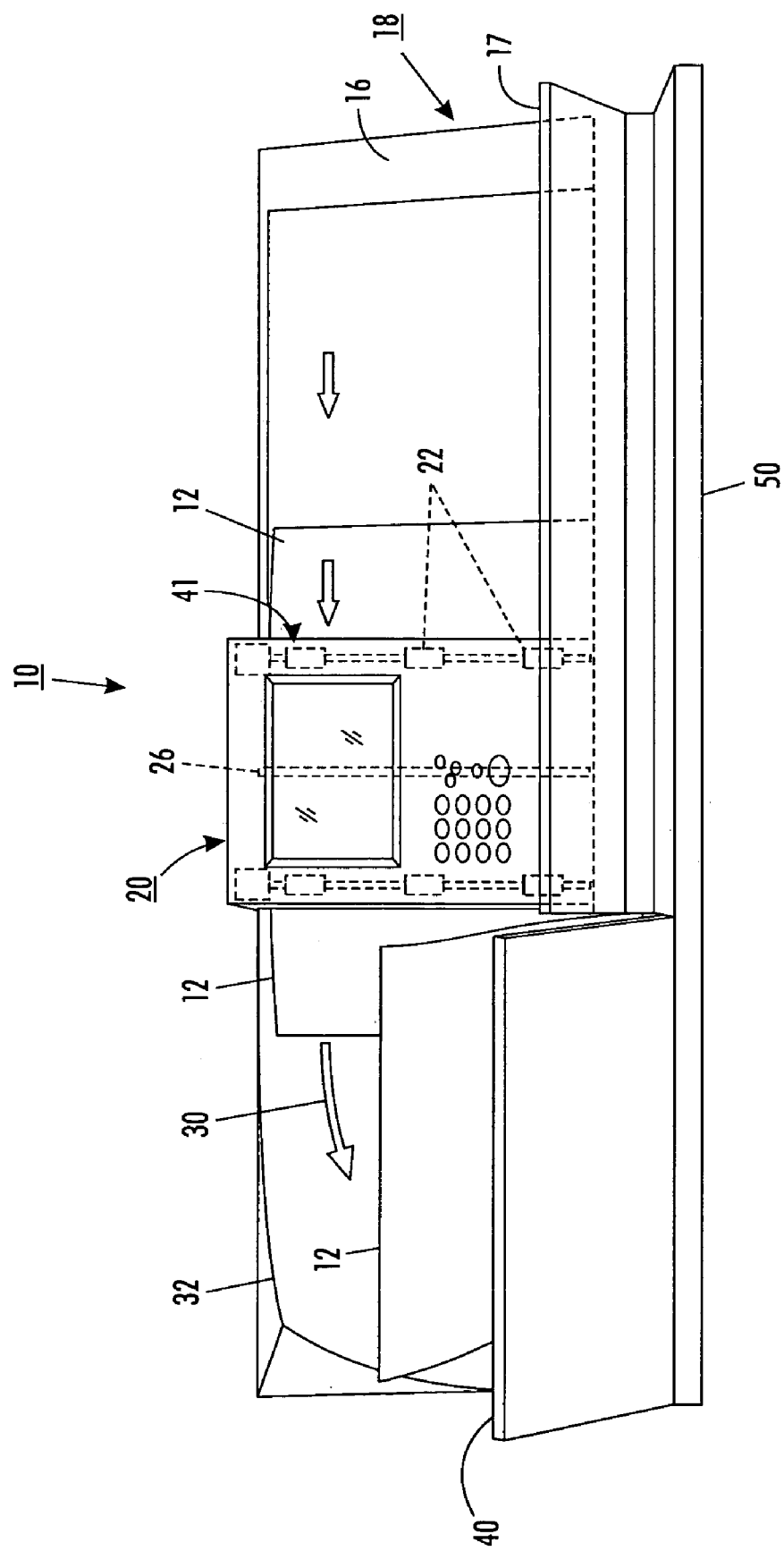
FIG. 1 is a frontal view of one example of the subject scanner, showing document sheets being loaded and fed to be scanned.
Figure 2:
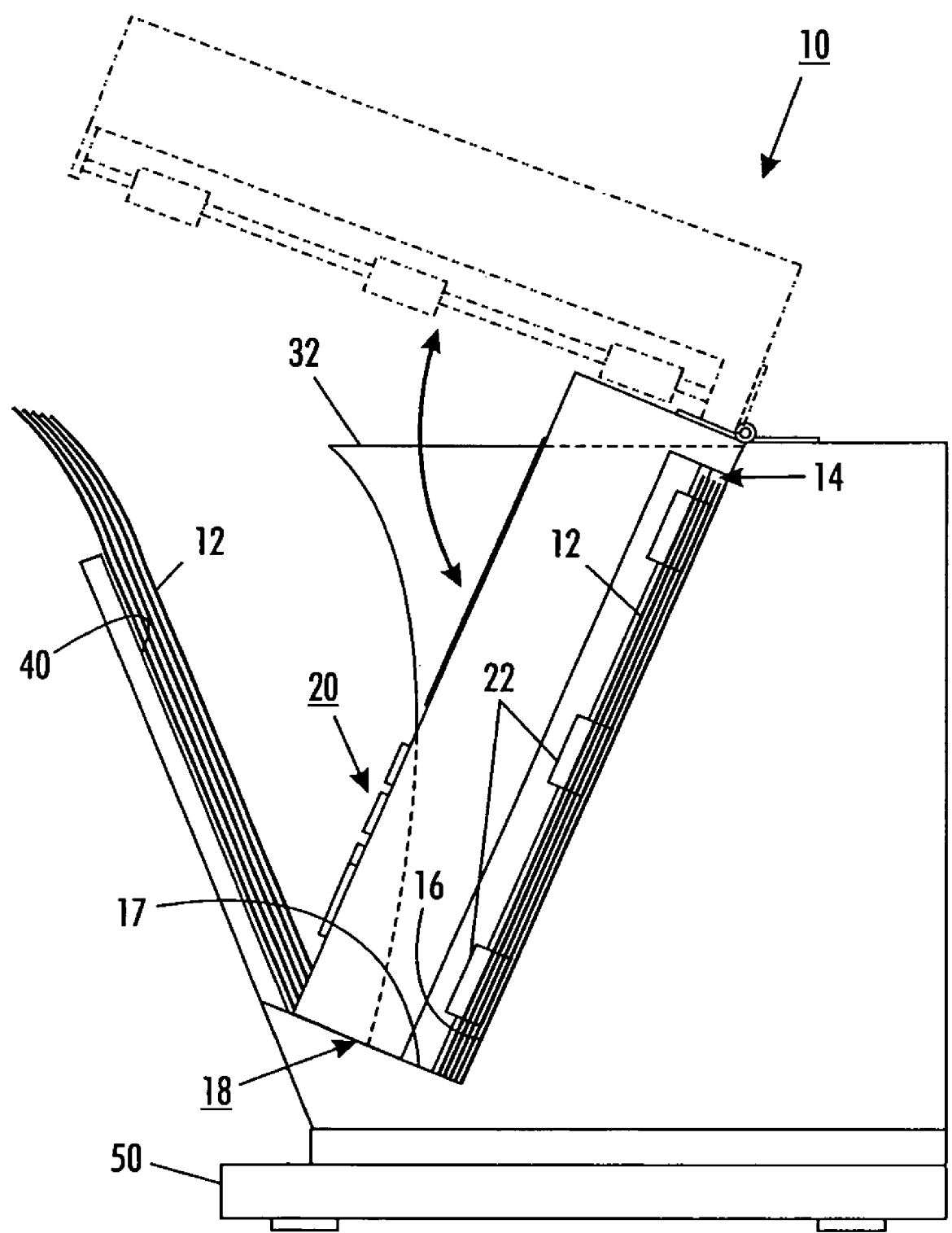
FIG. 2 is side view thereof.
Figure 3:
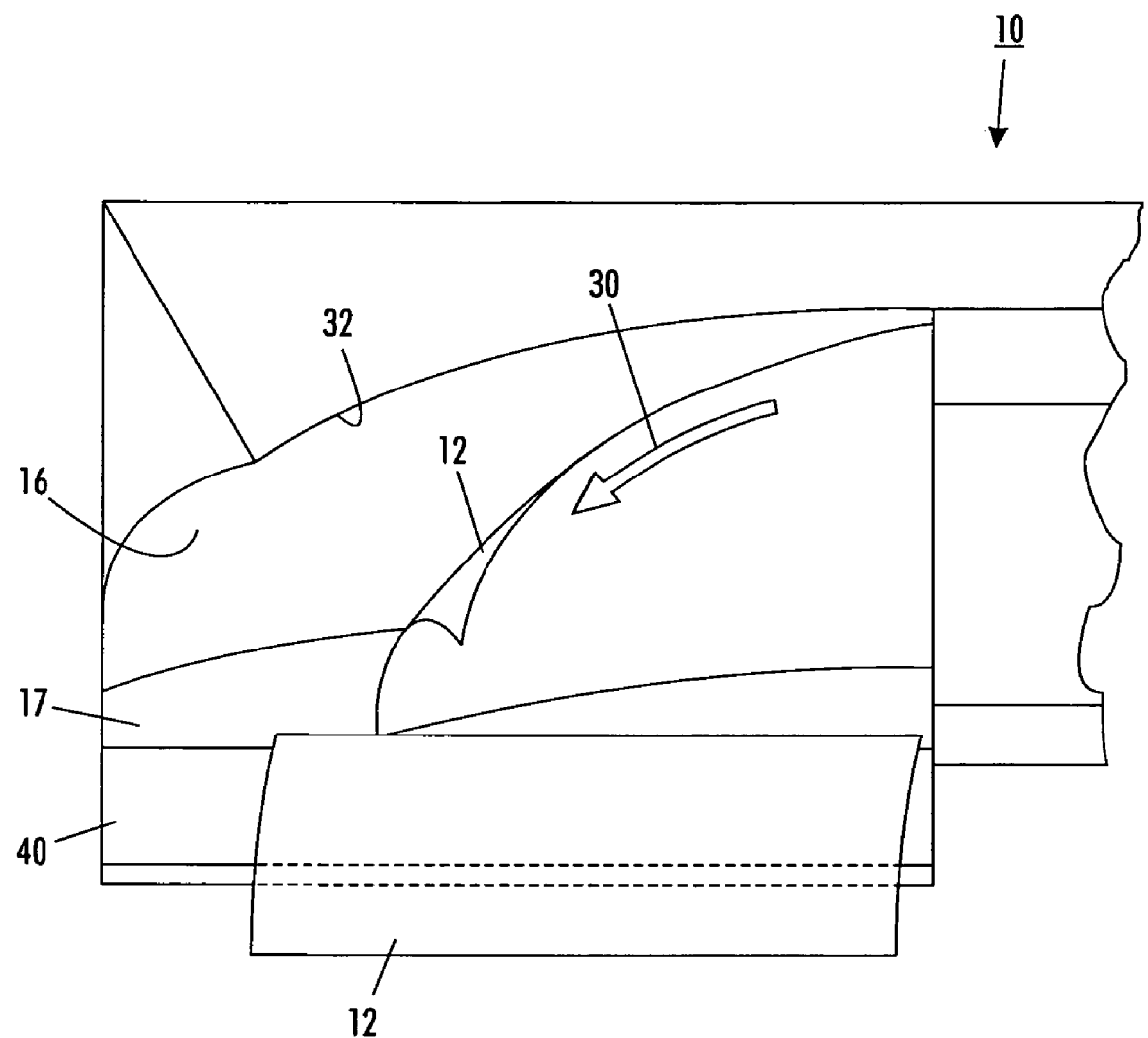
FIG. 3 is a partial and enlarged top view of FIGS. 1 and 2, further illustrating the automatic dropping and stacking of a sheet that has been scanned with this particular embodiment.

Describing now in further detail this exemplary embodiment with reference to the Figures, there is shown the exemplary scanning system 10 for scanning document sheets 12 with a document input path 14 provided by a supporting surface 16 at an upright or substantially vertical position but slightly inclined rearwardly at a substantially acute angle from the vertical, for example, from approximately vertical to approximately 45 degrees, and probably closer to approximately 45 degrees. This may be affected by the relative height of the unit to the operator if it is desired to replicate the type of angled paper support typical of a naturally ergonomic speaker's podium, for example. A more vertical angle may not adequately support the rear surface of the input documents and thus allow particularly flimsy documents to buckle gravitationally and fall forward, hence a design compromise that may vary with the particular documents, or with an angle that may be adjustable by the user. However, in the exit area for the documents, as will be discussed, this rear surface 16 angle may desirably tilt forward to intentionally cause the scanned documents to fall forward.

The mating sheet bottom edge guide and supporting surface 17 may desirably support most of the weight of the documents on the bottom edges of the documents in the document input area, and be substantially orthogonal to the rear document supporting surface 16 and thus substantially horizontal. However, in the document exit area this surface 17 angle may also change or twist, tilting down to assist document removal. These intersecting document supporting surfaces 16 and 17 together define a substantially vertical but significantly rearwardly inclined away from the user input tray 18 and a substantially continuous document movement and registration guide providing a substantially straight though paper path.

The scanning system 10 here may feed in and scan sequentially, from the top, documents in the input tray 18 to a scanning head 20. As shown in FIG. 1, input tray 18, scanning head 20, and output stacking surface 40 are positioned in a side-by-side arrangement in substantial alignment. The scanning head 20 in this example has conventional feed wheels 22 for engaging, separating and feeding in the top sheet on the supporting surfaces 16 and 17 defining the input tray 18. The scanning head 20 may be of various known or other systems containing, as here, an integral or separate constant velocity sheet transport and scanning digital imaging bars 26. The scanning head 20 may have a sheet feeding and scanning path therethrough in substantially the same plane as the input path 14 with its upright but rearwardly angled sheet supporting surface 16. In the front view of the system 10 the documents 12 thus move or feed generally from left to right in the same angled plane from the input path 14 through the scanning head 20, and after being so scanned exit from the scanning head 20 into a document output path 30.

This output path 30 here may be otherwise similarly formed to the input path 14, but additionally has an arcuate outwardly projecting sheet deflector 32 which engages at least a part of the upper portion of the exiting sheet 12 to push that sheet forwardly away from its original planar movement path (partially gravitationally supported by its partial rearward inclination) sufficiently for the sheet to fall forward with this impetus and then gravity onto a forwardly (instead of rearwardly) inclined or more horizontal output stacking surface such as 40. The bottom sheet edge guide surface 17 can extend across and through the entire scanning system 10, including the scanning head 20, to provide a substantially continuous orthogonal sheet bottom edge guide and support, but as noted above may terminate or twist downwardly in the sheet ejection area.

Note that this entire exemplary scanning system 10 may be an integral and self-standing unit with a base support 50 such that it may be mounted on any normal surface, such as a desk or table, at the above angle. The operator may sit, or stand facing the unit similar to the way a speaker would stand at a podium. The units operating controls, such as an operator keypad and touch screen are also more visible to the operator at the nearly vertical orientation of the unit. The near-vertical configuration of the entire system 10 takes up less considerably horizontal surface area or "footprint" than a normal scanner, thus leaving additional flat work surfaces or usable desk space available in front of the unit for users to organize their documents for scanning, as well as to set down other objects they may be carrying, or other uses. Documents to be scanned are placed in the input tray 18, where they lay supported substantially vertical but slightly angling away from the operator, and the sheets are fed in top sheet first into the scanning head 20. Thus, the sheet being fed to be scanned next is readily visible and readable by the operator. However, if desired, both sides of the document can scanned in one pass if desired, by having scanning or imaging bars 26 on both sides of the document CVT path. As each sheet feeds out into the output path 30 it is automatically tipped forward toward the operator by the sheet deflector 32 so that the next sheet exiting lands behind it, on top of it, thus restacking the sheets in the proper collated page order.

The input sheets stack, with strong gravity assistance, on the sheet bottom edge registration edge 17 in the input tray 18. That may also naturally ergonomically induces an operator to "tamp" a stack of sheets on their bottom edges on the support desk surface or otherwise prior to loading them into the input tray 18. Both may address a major contributor to sheet skew in conventional document handlers, in which the sheets are dropped vertically onto a horizontal input stacking tray which has no such inherent gravity tamping deskewing, and thus often have significant initial different skew angles of sheets to their subsequent sheet feeding direction. Here, the sheets are affirmatively gravity aligned with their subsequent movement direction, and edge-guided to stay in alignment by their lateral movement in sliding along the bottom registration edge 17, which can extend from the input tray 18 into or even through the feed head 20 and beyond. This surface 17 may be treated or coated with TEFLON® or other low friction materials, and may be a hardwearing material resistant to abrasion from the paper bottom edge moving along this surface 17.

The disclosed short and straight through or planar paper path is also gentler on originals than a system with a paper path that wraps the sheet around arcuate bends. The potential for document damage or jams is reduced, the sheet drag and drive loads on the motors providing the sheet feeding may be reduced, and audible noise may be reduced. Productivity can also be increased by the shorter paper path and its higher speed.

As disclosed, the sheets being scanned may be fed continuously guided on one edge, their bottom edge. After scanning, while still moving in the same direction, each sheet it may be simply tipped over center at the exit area for proper collated restacking from the disclosed top-side sheet input feeder. The sheet can be tipped over passively without any added mechanical movements by the action of the exiting sheet against the configuration of the back exit wall, defining a sheet deflector 32 as shown, or alternatively by other mechanical means. The total number of drive components and their cost for the system 10 are minimized by this and the short and simple paper path here.

Although a stationary document moving scanner system is not illustrated here in this particular embodiment, it will be appreciated from the above-cited patents that it is well known to integrally combine such a system with the moving document fixed imaging bar type of scanner illustrated here, where desired. Such as having a pivotal lifting cover for the illustrated scanning head 20 and having a transparent platen in the plane of, and forming part of, the substantially vertical document sheet lateral transport path here.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A substantially vertically inclined document scanning apparatus comprising as components in a side-by-side operative arrangement:
   a topside input feeder tray or input tray;
   a digital scanning head; and
   an output stacking surface;
   all of said components in substantially upright in said side-by-side alignment and mounted on a same horizontal surface;
   said digital scanning head located at substantially the same vertical level and located between said input tray and said output stacking surface, and
   adapted to receive paper from said input tray and transport said paper to said output stacking surface;
   said input tray having a paper supporting surface that is tilted rearwardly away from a user and enabled to feed an uppermost sheet of said stacking surface to said digital scanning head;

said paper supporting surface enabled to provide a document input and feeding path at an angle inclined rearwardly away from a user and enabled to feed paper into said digital scanning head at substantially a same said angle;

said digital scanning head comprising a velocity sheet or paper transport and at least one digital scanner;

said sheet or paper transport enabled to move said paper fed from said input tray and pass by said digital scanning head to said output stacking surface;

a sheet deflector positioned adjacent said output stacking surface which tips sheets on said output stacking forward toward said user;

said output stacking surface tilted or inclined forward toward said user and enabled to receive and cause said paper to fall via gravity forward and be in collated order when fed thereto from said digital scanning head.

2. The apparatus of claim 1 wherein said feeding path extends from said input tray through said digital scanning head to said output stacking surface.

3. The apparatus of claim 1 wherein said digital scanning head is tilted in substantial alignment with said input tray.

4. The apparatus of claim 1 wherein said input tray is enabled to feed sheets sequentially with an uppermost sheet of a stack first from said input tray to said digital scanning head.

5. The apparatus of claim 1 enabled to provide said sheets of a stack in said output stacking surface to be in the same order in which said sheets are fed from said input tray to said digital scanning head.

6. The apparatus of claim 1 adapted to be mounted on a base support or working area positioned at least partially in front of said components.

* * * * *